July 12, 1949.

G. LEROY 2,475,748

BOILER TUBE TEST PLUG

Filed Oct. 10, 1945

Gene LeRoy

INVENTOR.

BY

ATTORNEYS.

Patented July 12, 1949

2,475,748

UNITED STATES PATENT OFFICE 2,475,748

BOILER TUBE TEST PLUG

Gene Leroy, South Charleston, W. Va.

Application October 10, 1945, Serial No. 621,468

3 Claims. (Cl. 220—24.5)

This invention relates to boiler tube test plugs, the object of the invention being to provide a test plug which may be readily and easily positioned in a tube to be tested, sealing the tube to permit the testing of the tube under high pressure.

An important object of the invention is to provide a plug of this character embodying a rubber sleeve or sealing member mounted on the body portion of the device, in such a way that the sleeve will be spread evenly, to seal the area of contact between the plug and tube wall, in which it is positioned.

Still another object of the invention is to provide securing means which is so constructed and arranged that as pressure is directed to the rubber sleeve to expand the sleeve, the gripping jaws are simultaneously spread to grip the wall of the tube under test and hold the plug securely against movement under pressure.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing.

Figure 1:
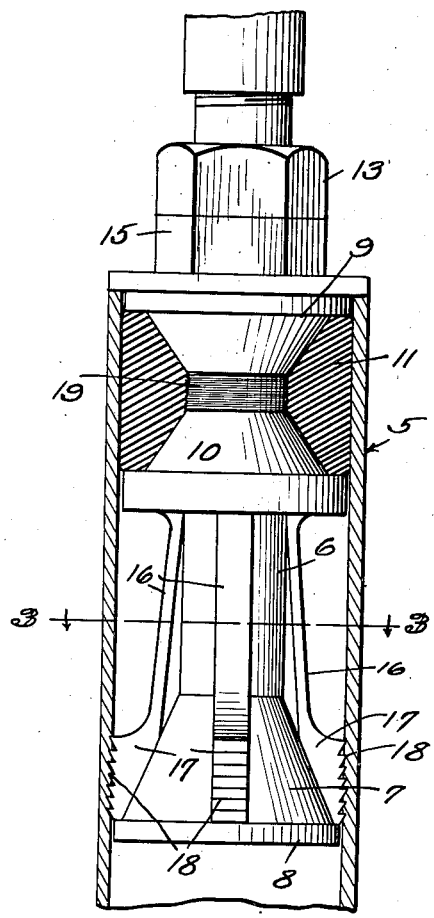
Figure 1 is a longitudinal sectional view through a tube showing the test plug as positioned therein.

Referring to the drawing in detail, the reference character 5 indicates a boiler tube in which the test plug, forming the subject matter of the present invention, is positioned.

Figure 2:
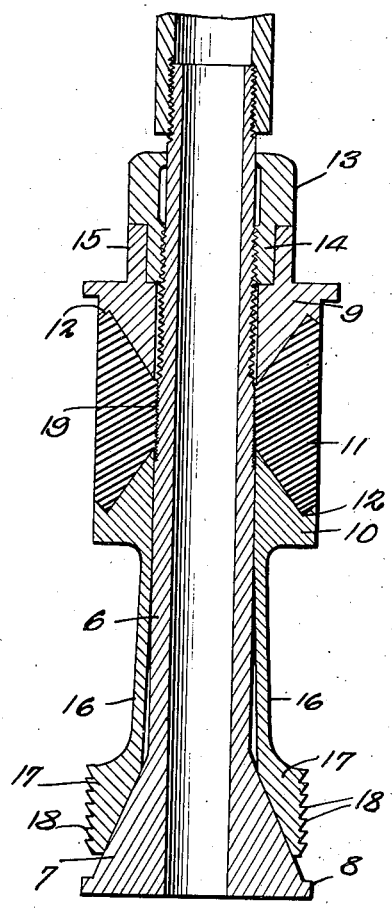
Figure 2 is a longitudinal sectional view through the test plug.
Figure 3:
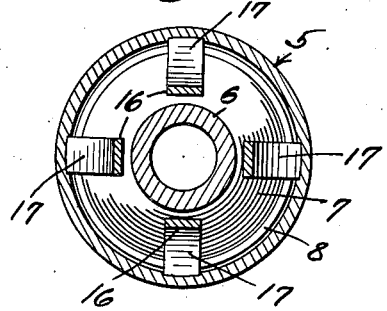
Figure 3 is a sectional view taken on line 3—3 of Figure 1.

The test plug comprises a main tubular section 6 which is formed with an enlarged end 7, the outer surface of which slopes inwardly and upwardly, as clearly shown by Figure 2 of the drawing, and having an annular shoulder 8 formed at the extremity of the enlargement 7. The plug also includes an upper movable section 9 and a lower movable section 10, the adjacent surfaces of the sections 9 and 10 being tapered to fit within the tapered ends of the expansible sealing member 11 which is constructed preferably of rubber so that it will expand readily under pressure.

In order that the expansible sealing member will be securely held in position, grooves 12 are provided in the sections 9 and 10, to receive the edges of the expansible sealing member 11.

As clearly shown by Figure 2 of the drawing, the main tubular section is threaded throughout a portion of its length, the threads cooperating with the threads of the nut 13 which is formed with an extension 14 that fits within the space between the upstanding annular flange 15 and the main tubular section 6, the flange 15 being formed with wrench faces to hold the upper section 9 against rotation under the action of the nut 13, when the nut is operated to set up pressure between the sections 9 and 10 to expand the sealing member 11.

Formed integral with the lower section 10 are spaced spring arms 16 which have enlargements 17 formed at their free ends, the enlargements 17 having inclined surfaces that move over the upper inclined surfaces of the enlargement 7 so that when the lower section 10 is moved under the enlargement 7, the enlargements 17 will be forced readily into engagement with the inner surface of the boiler tube, in which the device is positioned. The outer surfaces of the enlargements 17 are formed with teeth 18 that bite into the inner surface of the tube in which the plug is positioned, when pressure is brought to bear on the enlargements due to the movement of the spring arms 16.

Formed on the outer surface of the main tubular section 6, and disposed at a point adjacent to the inner end of the threaded section thereof, are serrations 19 which provide a roughened surface to contact with the expansible sealing member to insure against the main tubular section moving with respect to the expansible sealing member 11.

In the use of the device the plug is inserted in one end of a tube to be tested under high pressure, whereupon the nut 13 is rotated to force the upper and lower sections of the plug downwardly. With the downward movement of the sections of the plug, the enlargements 17 are forced laterally until the teeth thereof bite into the inner surface of the tube and anchor the plug in position. Upon further rotary movement of the nut 13, the upper section 9 is moved towards the lower section 10 causing the expansible sealing member 11 to be spread into sealing relation with the tube in which the device is positioned.

Because of the shoulder 8, it will be obvious that movement of the arms 16 to become wedged between the enlargements 7 and the tube will be prevented by contact of the ends of the arms with the shoulders, thus restricting movement of the arms longitudinally of the tubular section 6.

What is claimed is:

1. A high pressure plug for positioning in tubes, comprising a tubular member an enlargement at one end of the tubular member, said enlargement having a sloping surface, upper and lower sections movable towards each other, an expansible sleeve mounted between the sections, means for moving the sections towards each other expanding the sleeve, longitudinal spaced arms, extending from the lower section, enlargements on the lower ends of the arms the enlargements of the arms adapted to move over the sloping surface of the enlargement at one end of the tubular member, expanding the arms, teeth formed on the outer surfaces of the enlargements, being so constructed and arranged to bite into the wall of the tubular member in which the plug is positioned when the arms are expanded, securing the plug against movement within the tube, and said expansible sleeve adapted to expand into sealing relation with the tube in which the plug is positioned.

2. A high pressure plug for positioning in boiler tubes, comprising a tubular member, upper and lower sections mounted on the tubular member, means for moving the sections towards each other, an expansible sleeve mounted between the sections and adapted to expand into engagement with the tube in which the device is positioned, depending elongated spring arms formed on the lower section, enlargements formed on the free ends of the arms, teeth formed on the enlargements, said teeth adapted to bite into the wall of the tube in which the device is positioned, said arms and tubular members having cooperating beveled surfaces adapted to move the arms laterally into contact with the wall of the tube as the arms move longitudinally of the tubular member and means for spreading the expansible sleeve into sealing contact with the tube under test.

3. A high pressure test plug for positioning in tubes, comprising a tubular member, a tapered enlargement on one end of the tubular member, cooperating expanding sections mounted on the tubular member, said expanding sections having tapered surfaces, an expansible sleeve mounted on the tapered surfaces of the expanding sections, means for moving the sections towards each other, expanding the sleeve into contact with the wall of a tube in which it is positioned, spring arms forming a part of one of the sections, the free ends of the arms adapted to move over the tapered enlargement moving the arms into contact with the wall of the tube, in which the device is positioned when the sections are moved toward each other, securing the plug within the tube.

GENE LEROY.

REFERENCES CITED

The following references are of record in the file of this patent:

UNITED STATES PATENTS

| Number | Name | Date |
|---|---|---|
| 775,124 | Christman | Nov. 15, 1904 |
| 1,068,793 | Mason | July 29, 1913 |
| 1,202,704 | Goff | Oct. 24, 1916 |
| 2,374,947 | Nicholson | May 1, 1945 |